(No Model.)

R. N. ROSS.
FRICTION CLUTCH.

No. 298,708. Patented May 13, 1884.

Attest:
Charles Pickle
Geo. L. Wheelock

Inventor:
Rob't N. Ross
By Knight Bro's
Att'ys

N. PETERS, Photo-Lithographer, Washington, D. C.

UNITED STATES PATENT OFFICE.

ROBERT N. ROSS, OF JEFFERSONVILLE, INDIANA, ASSIGNOR OF ONE-FOURTH TO HENRY H. KELLER, OF LOUISVILLE, KENTUCKY.

FRICTION-CLUTCH.

SPECIFICATION forming part of Letters Patent No. 298,708, dated May 13, 1884.

Application filed September 19, 1883. (No model.)

*To all whom it may concern:*

Be it known that I, ROBERT N. ROSS, of Jeffersonville, in the county of Clarke and State of Indiana, have invented a certain new and useful Improvement in Friction-Clutches, of which the following is a full, clear, and exact description, reference being had to the accompanying drawings, forming part of this specification, and in which—

Figure 1:
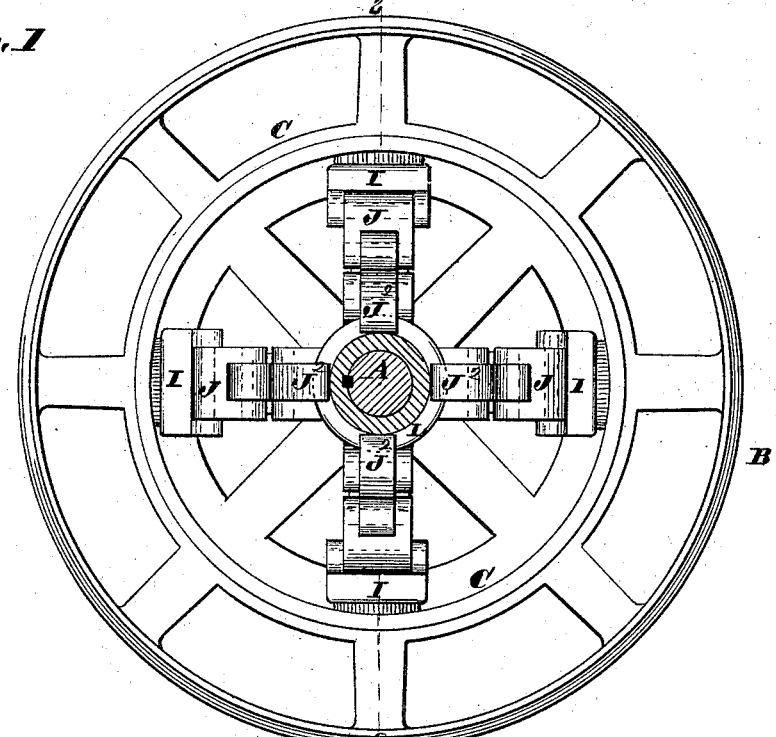
Figure 2:
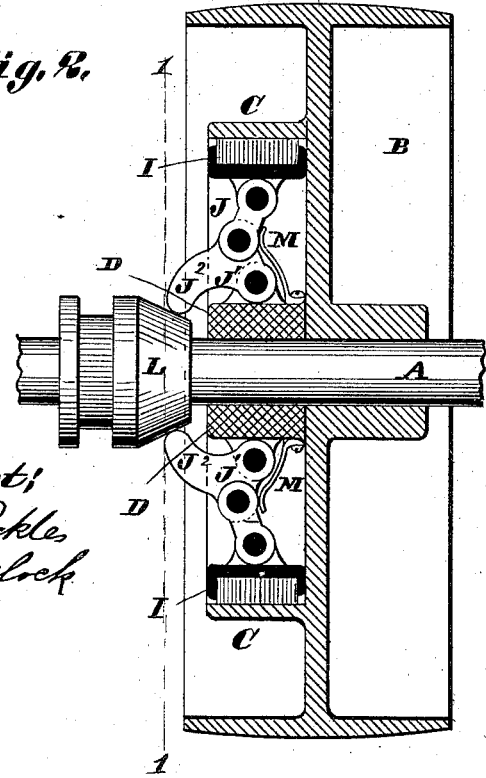

Figure 1 is an edge view of a driving-pulley, or a section taken on line 1 1, Fig. 2; and Fig. 2 is a vertical section taken on line 2 2, Fig. 1.

My invention relates to a clutch device more particulary intended for use in a brick-machine where an intermittent movement of the working parts is desired; but it may be used on other machinery when desired.

My invention consists in features of novelty hereinafter fully described, and pointed out in the claims.

Referring to the drawings, A represents a shaft, and B a driving-pulley thereon, but not secured thereto. On one side of the pulley, between the rim and the hub, is cast or otherwise secured a flange, C.

D represents a collar secured to the shaft, close up against the pulley, on the same side as the flange C.

I represents blocks, which are secured to the collar D by toggle-links J J', of which any desired number of sets may be used. I have shown four, but do not confine myself to that number, as more or less may be employed. The links J' of the toggles have projections $J^2$ extending outward from the pulley and inward toward the shaft. The blocks I may be cup-shaped, as shown in Fig. 2, and adapted to hold blocks of wood or other suitable material, which may be renewed as they become worn.

L represents a sliding collar on the shaft, which is preferably connected thereto by a feather and groove. To this collar is connected a suitable operating-lever, by which it can be slid to and from the pulley. The lever would preferably be secured to the collar by a ring fitting in a groove in the collar and pins on the ring engaging with the lever, as is common in machinery. It will now be seen that when it is desired to turn the shaft the pulley can be engaged therewith by forcing the sliding collar toward the pulley, its conical end coming in contact with the projections $J^2$ of the links J', thus forcing the blocks I outward, causing them, or, what is the same thing, the friction-pieces secured in them, to come against the flange C, thus forming a connection between the collar D and the pulley. Then, by moving the sliding collar in the other direction, the friction-blocks will be removed from the flange by springs M, secured to the collar D and bearing against the links, or by other suitable means, and the pulley allowed to turn freely on the shaft.

I claim as my invention—

1. In a friction-pulley, the combination, with a flange between its rim and hub, of a collar, radially-sliding block, toggle hinging the collar and block together, having a projection to bear on a sliding collar on the shaft, and a spring to press the projection outwardly, as set forth.

2. The combination of shaft A, pulley B, having flange C, blocks I, tight collar D, toggle-links J J' $J^2$, springs M, and sliding collar L, having a conical inner end, all substantially as shown and described, for the purpose set forth.

ROBERT N. ROSS.

In presence of—
JONA. JOHNSON,
HARRY D. GRESHAM.